Dec. 1, 1953
T. C. VAN DEGRIFT
2,660,881
CREEP TESTING OF HIGH-TEMPERATURE ALLOYS
Filed Oct. 29, 1947
2 Sheets-Sheet 1
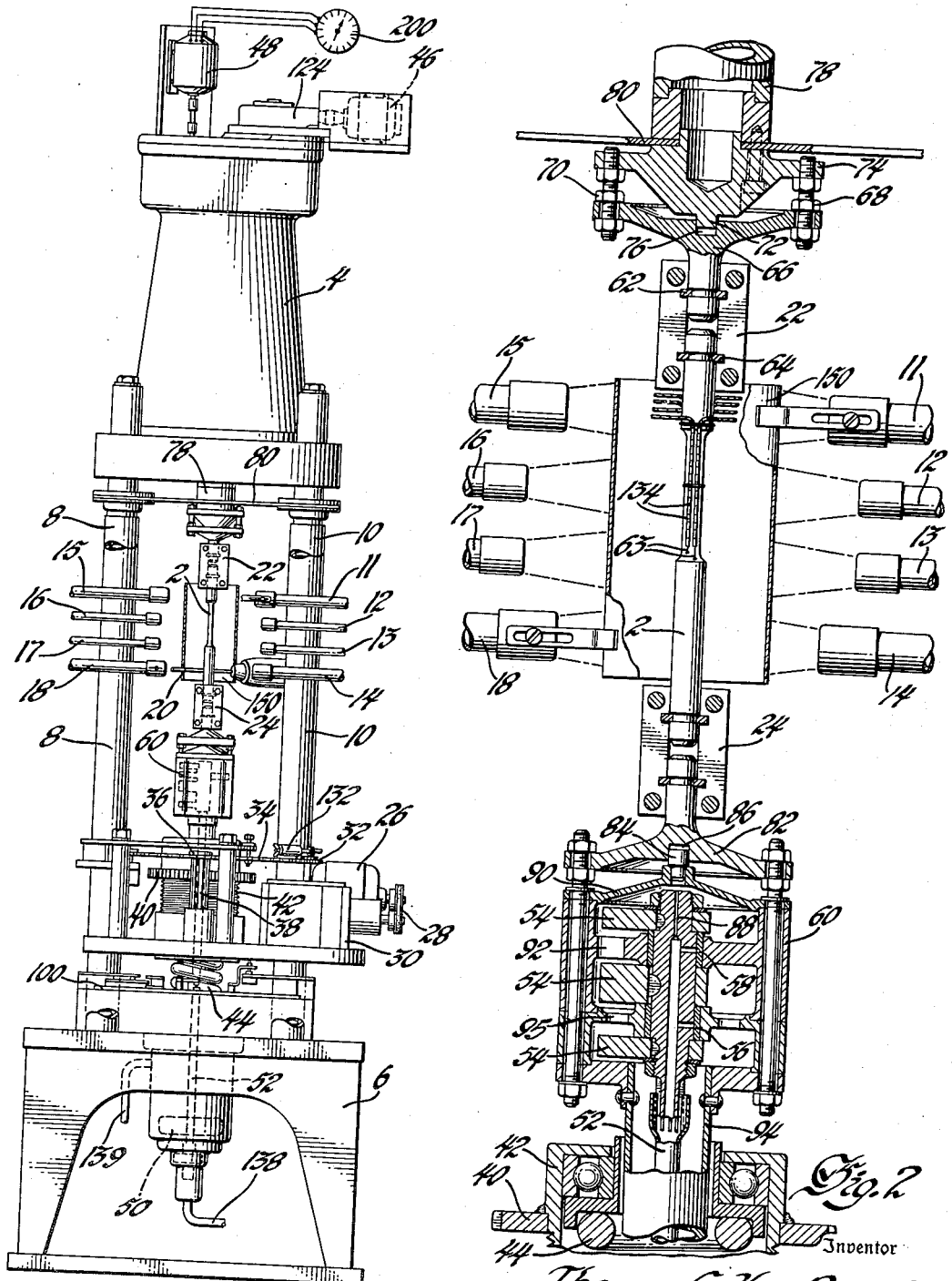
Inventor
Thomas C. Van Degrift
By Spencer, Willits, Helwig & Baillie
Attorneys Dec. 1, 1953 T. C. VAN DEGRIFT 2,660,881
CREEP TESTING OF HIGH-TEMPERATURE ALLOYS
Filed Oct. 29, 1947 2 Sheets-Sheet 2
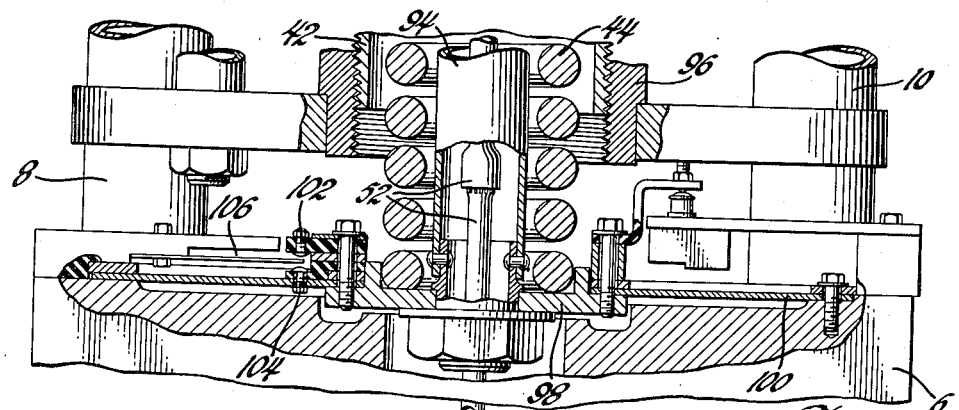
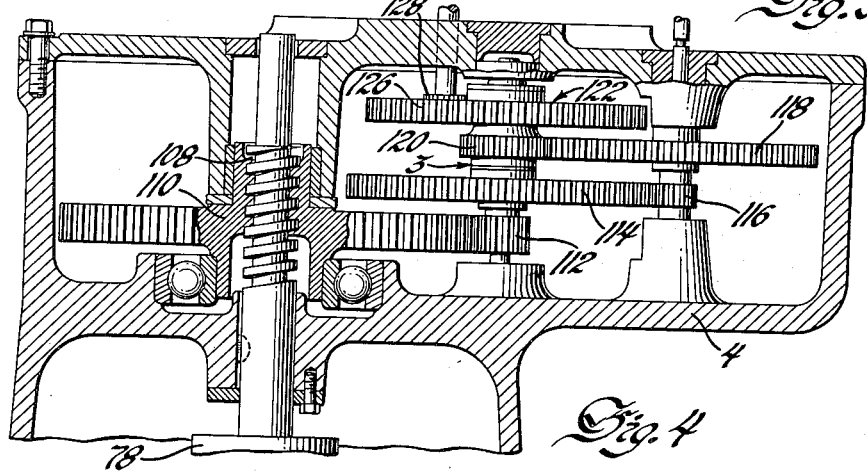
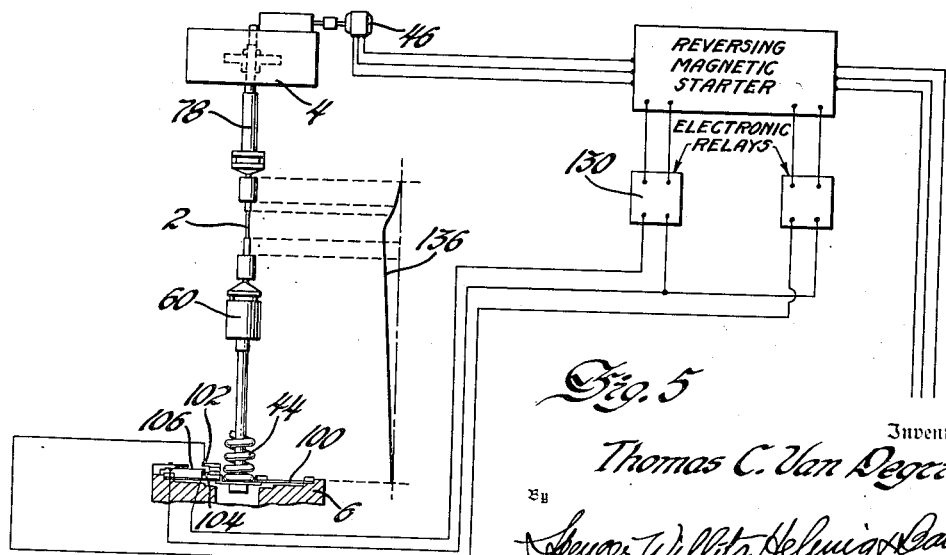
Inventor
Thomas C. Van Degrift
By
Spencer, Willits, Helmig & Baillio
Attorneys Patented Dec. 1, 1953

2,660,881

UNITED STATES PATENT OFFICE 2,660,881

CREEP TESTING OF HIGH-TEMPERATURE ALLOYS

Thomas C. Van Degrift, Detroit, Mich., assignor to General Motors Corporation, Detroit, Mich., a corporation of Delaware Application October 29, 1947, Serial No. 782,855

4 Claims. (Cl. 73—15.6)

The present invention relates to creep testing equipment for high temperature alloys such as used in gas turbine blades.

More particularly the present invention relates to a method of, and apparatus for subjecting test specimens to tensile and vibratory stresses while heating said specimens to a high temperature, and measuring the effect of said stresses and heating.

The ability of gas turbine blading materials to withstand high temperatures and loads is one of the principal limiting factors in gas turbine design. The development of a blading material which could withstand higher temperatures would result in much higher gas turbine efficiency.

In one of the modern jet propulsion engines the blades in service are subjected to the combined effects of the following:

(a) The turbine blades operate at a temperatrue of from 1200 to 1500 degrees Fahrenheit.

(b) Centrifugal tensile stresses in the blades reach a magnitude of 25,000 pounds per square inch.

(c) Vibratory stresses are set up within the blade itself at various high frequencies.

(d) The action of hot combustion gases tends to disturb the physical characteristics and surface condition of the blades.

Considerable data on the properties of alloys at high temperatures has been collected by many investigators using equipment available before the present invention. There are two principal types of laboratory tests which have previously been used for determining the suitability of alloys for gas turbine blades. One of these tests consists of subjecting the alloys in question to high temperature and static tensile load. When tested under these conditions the material may be deformed in a plastic manner or creep. This gives static tensile characteristics of the test specimen under high temperature conditions. This test may be either carried out as a creep test or as a creep to rupture test. The creep test consists of subjecting the test specimen to a relatively small constant load for several thousand hours and is commonly used in testing gas turbine blade material. The second principal test used to test gas turbine blade material is a reverse bending test. This test consists of subjecting the material to bending stresses in alternate directions while maintained at a high temperature.

These two tests have been commonly used since it is very desirable to obtain characteristics of gas turbine blade alloys under both bending and tensile strains. The aggregate results of these two individual tests, however, cannot be relied upon to predict the physical characteristics of an alloy when subjected to combined tensile and vibratory stresses while simultaneously being exposed to hot combustion gases.

It is therefore an object of the present invention to produce a method of testing which will predict the physical characteristics of alloys under combined tensile static and transverse vibratory stresses.

It is a further object of the present invention to produce a machine for subjecting test specimens to static tensile loads, vibratory transverse loads and hot combustion gases simultaneously, this machine to be capable of accurately applying these three quantities and measuring the specimen deformation resulting therefrom.

It is a still further object of the present invention to produce a test machine that will reproduce service conditions of gas turbine blades and is reliable to operate and simple in construction.

Other objects of the present invention will become obvious upon reading the specification and inspection of the figures of the drawings and claimed in the appended claims.

Referring to the drawings:

Figure 1 is a general arrangement drawing of a machine embodying the present invention.

Figure 2 is a partial sectional view of the part of this machine showing the means of heating the test specimen and introducing vibratory stresses.

Figure 3 is a detail enlarged partial view of Figure 1 with parts broken away and shown in section.

Figure 4 is a partial sectional view of the gear box containing part of the follow-up mechanism.

Figure 5 is a schematic showing of the follow-up mechanism designed to maintain constant load on the test specimen.

Referring more particularly to Figure 1, the test specimen 2 is mounted in the test machine having an upper housing 4 and a base member 6 connected by tubular pillars 8 and 10.

The test specimen while thus supported is subjected to the combined effect of hot combustion gases, static tensile stresses, and transverse vibratory stresses. The adjustable gas burners 11, 12, 13, 14, 15, 16, 17 and 18 cause hot gases to impinge on the heat shield 150 to heat the test specimen. This shield is open at both ends thus exposing the test specimen to the hot gases. It does, however, prevent the burner flame from impinging directly on the test specimen and causing hot spots with resulting inaccurate test results. The control probe 20 of conventional construction is used to turn off the gas supply in the event the burners are for some reason accidentally extinguished. The test specimen 2 is supported between clamps 22 and 24 so as to receive the static tensile and transverse vibratory stresses. The tensile loading system includes motor 26, belt drive 28, gear box 30, sprocket 32, chain 34, sprocket 36, spline shaft 38, gear 40, threaded cap 42, loading coil spring 44, together with other necessary elements. A follow-up system for maintaining the tensile stress system in equilibrium and for recording the amount of strain is included in the housing 4. This system also includes follow-up drive motor 46 and Selsyn generator 48 located on the housing. The transverse vibratory stress system includes a synchronous motor 50 of desired size and speed, together with a drive shaft 52 and unbalanced weights 54. The motor 50 is directly connected to these unbalanced weights 54 and by means of these weights cause unbalanced stresses which result in transverse strain of the test specimen. An oil circulating system including an inlet 138 and an outlet 139 is provided for lubricating the bearings 56 and 58 and supplying oil to the cooling jet 88.

Referring to Figure 2, the gas burners 11 through 18 are shown in greater detail, together with the thermocouples 63 used to control the burners and to record the temperature of the test specimen. As shown in this figure the test specimen is attached to the upper member 22 by means of collars 62 and 64. It will be noted that the member 22 has two mating halves which permit the clamping of the test specimen 2 so as to hold it rigid in a transverse direction and exert longitudinal tensile stresses. The clamping member 22 is secured to a member 66 in such a way as to be adjustably supported by screws 68 and 70 and be maintained in fixed alignment by means of projection 72 in the member 74 mating with depression 76 in the member 66. The adjusting screws 68 and 70 permit movement of the member 66 relative to member 74 so as to facilitate the coaxial alignment of the member 22 with the member 24. The member 74 is secured to the tensile loading bar 78 and to metal diaphragm 80.

Referring to the lower part of Figure 2, the clamping member 24 is identical to the member 22 mentioned above. The member 82 is substantially the same as member 66 which is held by the member 22 above. The members 66 and 82 in addition to acting as supporting and stress transmitting members, also operate as heat dams to minimize the transfer of heat from the test specimen heating zone to the members 74 and 90. The member 82 is attached to the housing 60 by means of mating projection 84 and depression 86. This permits the introduction of the vibratory forces set up by the rotating weights 54 through the housing 60 to the test specimen 2. The vibratory system including the weights 54 is supported in the housing by means of bearings 56 and 58 and is driven by means of the tubular shaft 52. The tubular shaft 52 has a second purpose. This second purpose is to transmit lubricating and cooling fluid to the bearings 56 and 58 and also to the cooling jet 88. The oil from this cooling jet 88 impinges on the member 90 cooling this member and also the other portions of the housing 60. The oil then, under the force of gravity, proceeds through the openings 92 and 95 to the cavity between the tubular rotating member 52 and the tensile stress member 94 back to the oil outlet 139. The oil pump for circulating this oil may be of any suitable type.

The gear 40 is rigidly attached to the threaded member 42. Figure 3 is an extension of Figure 2 and referring to Figure 3 it will be noted that this screw 42 mates with a member 96. This member 96 is rigidly attached to the pillars 8 and 10 mentioned in connection with Figure 1. The coil spring 44, through plate 98, exerts a tensile stress on the tubular member 94. The plate 98 is maintained in a fixed position radially but is allowed a limited freedom of axial movement by means of diaphragm 100. This system carries thereon movable contacts 102 and 104 which mate with stationary contact 106 to energize the follow-up system, which will be mentioned later.

Referring to Figure 4, the upper portion of the housing 4 is shown in sectional form. In this figure it will be noted that the member 78 has a threaded portion 108. This threaded portion mates with an internally threaded portion of the gear member 110. The gear 110 is driven by spur gear 112 which is rigidly attached to larger spur gear 114 by reason of their both being keyed to the same shaft. Larger spur gear 114 is driven by smaller spur gear 116, which gear is in turn rigidly attached to gear 118 since they are keyed to a common shaft. The gear 118 is driven by spur gear 120 which spur gear is rigidly attached to gear 122. The gear 122 is connected to the gear box 124, see Figure 1, by means of a spur gear 126. This gear system is part of the follow-up system necessary to maintain the system in equilibrium as will be described later. In order to determine and record the amount of movement in an axial direction of the clamp 22 and hence determine the tensile deformation of the test piece, a Selsyn generator 48 is connected to the gear 110 by means of a small spur gear 128.

Referring to Figure 5, this follow-up system is shown in a schematic form. The tensile system is so designed that all measurable changes in elongation occur in the necked down portion of the specimen 2. It will therefore be seen that as the force exerted through the coil spring 44 causes deformation of the test specimen, the movable contact 102 will approach a stationary contact 106. When an electrical circuit is completed through these contacts the electronic relay 130 causes the motor 46 to rotate in such a direction as to move the upper securing member 78 up in a vertical direction. This movement is reflected through the rest of the system causing the contact 102 to break with contact 106 thus stopping the motor 46. With this sysem thus operating the diaphragm 100 is maintained in a horizontal position so that all deformation of the test specimen 2 is reflected in vertical movement of the member 78. This vertical movement is recorded by means of the Selsyn generator 48 and a mating Selsyn receiver 200.

Having thus described the apparatus in general, it is now considered desirable to discuss the systems included therein individually.

*Static load adjusting system*

A tensile test is applied to the test specimen by means of the helical spring 44 of known rate. A spring having a rate of 1700 pounds per inch and capable of having a load of 4500 pounds was found to be suitable in one particular application of the present invention. This spring being of known rate, it is possible to determine the load which it exerts by measuring the amount it is compressed. The bottom end of this spring is maintained in a fixed position by means of the follow-up mechanism described in connection with Figure 5 above. The spring is compressed from its upper end by means of a loading system driven by motor 26. This motor, through belt drive 28 and gear box 30, drives a chain sprocket 32. Motion is transmitted from this sprocket to the driving gear or splined shaft 38 by means of a chain 34 and a mating chain sprocket 36 located on this gear or shaft. This shaft causes the member 42 to be rotated and thus screwed into the member 96 by rotating gear 40. The amount this gear 40 is rotated and thus the amount the spring is compressed is measured by the rotation counter 132. This counter may be calibrated to read in pounds force for a given spring or in pounds per square inch exerted on the test specimen for a given rate loading spring 44 and a given diameter specimen 2. As the load is exerted on the test specimen 2 it deforms in a longitudinal direction causing the contact 102 to approach a contact 106. As a circuit is made between these contacts the motor 46 is energized as described in Figure 4 and the plate 98 is moved upwardly until it occupies its original position. When in this original position the calibration of the coil spring 44 is accurate since the member 100 does not then exert any appreciable axial force. As this follow-up mechanism driven by motor 46 is activated, the Selsyn generator 48 is moved so as to indicate the amount of deformation of the test specimen 2. The instant invention is, of course, applicable for use in testing various materials. In one particular case this invention is used to test the properties of gas turbine blade materials. In this case the tensile stresses are maintained at a value of 25,000 pounds per square inch and longitudinal deformation over a period of time of about 400 hours is measured.

Heating system

In one particular embodiment of the present invention the specimen is heated by means of eight gas burners. These burners are controlled by and the temperature of the specimen is indicated by a series of thermocouples 63 attached to various positions on the specimen. These thermocouple wires are threaded through porcelain insulators 134 and spot welded to the surface of the specimen to form a hot junction. To prevent breakage of these thermocouple wires by the vibratory stresses set up by the test machine the porcelain insulators are strapped to the specimen along the length of the thermocouple. The thermocouple wires leave the specimen at its upper end where the vibratory motion is minimum and are connected by lead wires to the heat indicating and control system.

In one particular embodiment of the present invention, one of the thermocouple wires is attached to the lower fillet of the test specimen where the vibratory stresses are greatest. This thermocouple is not connected to the gas burner control system since the vibratory stresses make its usefulness quite short lived. The temperature of the test specimen under the action of the hot gases is maintained to within the small limits of plus or minus 5 degrees. These limits are located at various points within the operating temperature of the machine for which the material will be ultimately used. In the instant case, where the material is designed for use in gas turbine blades, this temperature range is located at some desired position between 1200 and 1500 degrees Fahrenheit.

Vibration excitation system

It was found desirable to excite the test specimen with vibratory stresses which would produce a maximum strain in opposite phase at the two ends of the specimen with a minimum strain near its midpoint. After experimentation it was found that a system with an elastic line as shown by 136 in Figure 5, was optimum. After a study of the frequency of vibratory stresses in gas turbine blades it was decided that one particular embodiment of the present invention should include a means for exerting approximately 10,000 stress cycles per minute. In order to exert the proper vibratory stresses, rotating weights of proper magnitude of unbalance were located in a housing 60 below the test specimen. The exciter motor in the three phase induction motor is supplied with 180 cycle current. The force excited by the rotating out of balance weights cause the bottom of the test specimen to move in a circle, with the centerline of the lower suspension system, that is, the lower chuck alignment head exciter case, and tube, generating the surface of a cone whose apex is at the center of the bottom diaphragm. The upper alignment head is held laterally rigid as previously mentioned. This system gives an elastic line as shown in 136 with a vibratory stress distribution which is maximum at the two ends of the specimen. In one particular embodiment the lower end of the specimen has a stress measured by means of a conventional wire strain gage of plus 13,000 pounds per square inch at the same instant the upper end of the test specimen has a stress of minus 9,000 pounds per square inch. This stress is obtained with exciter weights having a total unbalance of 2.4 oz. inches.

Cooling and lubrication of exciter case

The exciter case being located in the proximity of the burners is subjected to an appreciable amount of heating. In order to properly lubricate the bearings carrying the unbalance weights it is necessary that a large volume of oil be introduced to the case. In the present invention an oil pump, not shown, supplies oil to the inlet pipe 138 and exhausts it from the pipe 139. The oil is pumped through the opening in tubular shaft 52 to the bearings 56 and 58. This oil is also pumped through jet 88 to cool the case. The oil returns to the pump through the opening between the tubular shaft 52 and the tubular shaft 94 and through the outlet 139.

Elongation recording

The primary object of the present invention is to approximate service conditions in which an element is subjected to combined static tensile and vibratory transverse stresses in a hot combustion gas atmosphere over a long period of time. It is therefore necessary that the test equipment be so designed that tests can be conducted continuously for a long period of time. The present invention therefore permits the automatic operation of the entire system with simultaneous automatic indicating of certain stresses, strains and heat involved. Since the load and temperature of the machine is maintained constant throughout the test the elastic and thermal deformations of the machine are fixed. Therefore the movement of the jack screw is caused by the plastic deformation of the specimen and the suspension system. As mentioned above, the cross sectional area of the suspension system is considerably greater than that of the test specimen and also the suspension system is not subjected to the high temperature bearing on the test specimen. As a result practically all of the plastic deformation of the system occurs in the gage length of the test specimen. It may therefore be seen that the movement of the load adjusting screw relative to the frame of the machine is a measure of specimen elongation. This elongation is measured and recorded by means of the Selsyn system including the transmitter 48 and receiver 200 shown in Figure 1.

*Test procedure*

After the test specimens have been prepared the thermocouples are attached and the specimen placed in the testing machine. Only a few minutes is required to bring the test specimen up to temperature. It is necessary to leave the burner on for a period of twenty hours before all thermal deformation of the machine takes place. After this period of stabilization of the temperature, the static tensile and transverse vibratory stresses are introduced. The operation of the machine is continued from this period on to the end of the test period or to the rupture of the test specimen.

It is to be understood also that although the invention has been described with specific reference to a particular embodiment thereof, it is not to be so limited, since changes and alterations therein may be made which are within the full intended scope of this invention as defined by the appended claims.

I claim:

1. Apparatus for determining the effect of tensile and vibratory stresses on a material at a high temperature including: a pair of attaching members adapted to support a test piece, resilient means attached to one of said attaching members, means to apply a force to said resilient means to create a tensile stress in the test piece, electrical means responsive to movement of said one attaching member operable to move the other of said attaching members so that the tensile stress will be constant regardless of elongation strain of the test piece, means to apply a vibrating stress to the test piece and including rotating eccentric weights acting through a journal to transmit vibratory forces to the said one attaching member and including means to limit vibration of the other of said attaching members, means to apply heat to the test piece including a shield surrounding said test piece, and means to apply heat to the exterior of said shield to maintain the test piece at a constant temperature, means to measure the elongation stress of the test piece, and means permitting the determination of the tensile force applied to the test piece.

2. In apparatus for determining the physical characteristics of a rigid material including holding members to hold a test bar in the apparatus, a static loading system arranged to exert a tensile stress on the test bar of said material, vibratory means consisting of unbalanced weights adapted to be rotated in an axis parallel to the direction of the application of the tensile stresses for simultaneously exerting transverse vibratory stresses into said test bar, means to transmit vibrations due to rotation of the weights to one of the holding members, and a heating system for heating said test bar while exerting said tensile and vibratory stresses.

3. Apparatus for determining the physical characteristics of a test specimen including: two attaching members for supporting a test piece, stress means to resiliently apply tensile force to the first of said attaching members, moving means operable to longitudinally move the second of said attaching members, control means to govern said moving means to move the second attaching member in accordance with any tendency of the first attaching member to move longitudinally so that the tensile force remains constant upon strain elongation of the test piece, and vibratory means for applying a vibratory transverse stress to said test piece, said vibratory means including means to transversely vibrate said first attaching member and means to hold said second attaching means against said transverse movement.

4. Apparatus for determining physical characteristics as claimed in claim 3 wherein said vibratory means includes eccentrically rotatable members of known weight acting through bearings on said first attaching means.

THOMAS C. VAN DEGRIFT.

References Cited in the file of this patent

UNITED STATES PATENTS

| Number | Name | Date |
|---|---|---|
| Re. 22,416 | Eksergian | Jan. 11, 1944 |
| 1,193,686 | Heisler | Aug. 8, 1916 |
| 1,652,525 | Hahneman et al. | Dec. 13, 1927 |
| 1,906,340 | Scott | May 2, 1933 |
| 2,375,034 | Semchyshen | May 1, 1945 |
| 2,436,317 | Manjoine | Feb. 17, 1948 |